US008016547B2

(12) United States Patent
Propheter-Hinckley

(10) Patent No.: US 8,016,547 B2
(45) Date of Patent: Sep. 13, 2011

(54) RADIAL INNER DIAMETER METERING PLATE

(75) Inventor: Tracy A. Propheter-Hinckley, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 868 days.

(21) Appl. No.: 12/009,716

(22) Filed: Jan. 22, 2008

(65) Prior Publication Data

US 2009/0185893 A1 Jul. 23, 2009

(51) Int. Cl.
*F03D 11/00* (2006.01)

(52) U.S. Cl. ...................... 415/115; 415/191; 415/211.2

(58) Field of Classification Search .................. 415/115, 415/191, 202, 208.1, 208.2, 211.2; 416/1, 416/97 R, 233
See application file for complete search history.

(56) References Cited

U.S. PATENT DOCUMENTS

| | | | | |
|---|---|---|---|---|
| 4,040,767 | A | 8/1977 | Dierberger et al. | |
| 6,176,677 | B1 * | 1/2001 | Chevrefils et al. | 416/96 R |
| 6,186,741 | B1 | 2/2001 | Webb et al. | |
| 6,416,275 | B1 | 7/2002 | Itzel et al. | |
| 6,733,229 | B2 | 5/2004 | Burdgick et al. | |
| 6,984,101 | B2 | 1/2006 | Schiavo, Jr. | |
| 7,008,185 | B2 * | 3/2006 | Peterman et al. | 416/96 A |
| 7,090,461 | B2 | 8/2006 | Liang | |
| 7,121,796 | B2 | 10/2006 | Burdgick et al. | |
| 7,762,784 | B2 * | 7/2010 | Propheter-Hinckley | 416/224 |
| 2003/0026689 | A1 * | 2/2003 | Burdgick et al. | 415/115 |
| 2007/0231138 | A1 * | 10/2007 | Levine et al. | 416/97 R |

* cited by examiner

*Primary Examiner* — Ninh H Nguyen
*Assistant Examiner* — Andrew Knopp
(74) *Attorney, Agent, or Firm* — Kinney & Lange, P.A.

(57) ABSTRACT

A nozzle assembly for directing cooling fluid in a vane comprising a hollow airfoil containing at least two cooling chambers. The chambers are separated by a generally radial rib. A metering plate mount is attached to the rib. A metering plate, having at least one aperture for tuning the cooling fluid flow within the airfoil, is adjacent the metering plate mount.

20 Claims, 8 Drawing Sheets

RADIAL INNER DIAMETER METERING PLATE

STATEMENT OF GOVERNMENT INTEREST

This invention was made with Government support under contract number N00019-02-C-3003, awarded by the United States Navy. The Government has certain rights in this invention.

BACKGROUND

Gas turbine engines include a fan inlet that directs air to a compressor for compressing air. Typically, part of the compressed air is mixed with fuel in a combustor and ignited. The exhaust enters a turbine assembly, which produces power. Exhaust leaving the combustor reaches temperatures in excess of 1000 degrees Celsius. Thus, turbine assemblies are exposed to the high temperatures. Turbine assemblies are constructed from materials that can withstand such temperatures. In addition, turbine assemblies often contain cooling systems that prolong the usable life of the components, including rotating blades and stationary vanes. The cooling systems reduce the likelihood of oxidation due to exposure to excessive temperatures. The cooling systems are supplied with cooling fluid from part of the compressed air stream and air that enters the engine at the fan and bypasses the combustor.

The stationary vanes of the turbine assembly may be cooled by directing a cooling fluid through a series of internal passages contained within the airfoil of the vane. The internal passages create a cooling circuit. The cooling circuit of a vane will receive the cooling fluid from the cooling system to maintain the whole of the vane at a relatively uniform temperature.

Airflow through the vane cooling circuit is typically determined by the vane design, and is typically the same for all vanes in a single stage of the engine. The vane cooling circuit may include several internal cavities. It is often desirable to adjust and tune the cooling flow through the vane cooling circuit.

To adjust the flow, current technologies adhere a thin sheet metal plate that has one or more holes over one of the internal cavity inlets at the outer diameter of the vane. The metering plate placed at the internal cavity inlet does decrease the flow through the cavity, but it also causes the pressure of the cavity to drop. The contraction and expansion of air as it is forced through the metering plate magnifies the pressure drop, and thus efficacy of the cooling air. Another common way to adjust flow through in the vane is to use an inner diameter rib termination adjacent the bottom of the cavity to meter the flow of the cooling fluid. However, these inner diameter features are designed into the vane casting, and do not allow for post-casting adjustments to the fluid flow. While advances have been made in the cooling circuits contained within vane airfoils, a need still exists for a vane which has tunable cooling efficiency.

SUMMARY

Disclosed is a turbine vane segment having a platform and a shroud with an airfoil extending between the shroud and platform. The airfoil has a leading edge, a trailing edge, a pressure wall, and a suction wall. The airfoil includes a plurality of generally radial ribs extending between the pressure suction walls to define a plurality of discrete cavities between the leading edge and trailing edge that extend lengthwise of the airfoil. The shroud contains at least one opening to allow a cooling fluid into the cavities, and the platform contains at least one exhaust port to allow the cooling fluid to exit the cavities. At least one of the ribs has a metering plate mount adjacent a bottom side of the rib; and a metering plate is inserted within the airfoil into the metering plate mount.

In another embodiment, a nozzle assembly for directing cooling fluid in a vane comprising a hollow airfoil containing at least two cooling chambers is disclosed. The chambers are separated by a generally radial rib. A metering plate mount is attached to the rib. A metering plate, having at least one aperture for tuning the cooling fluid flow within the airfoil, is adjacent the metering plate mount.

In another embodiment, a method of cooling a multicavity vane for a gas turbine engine is disclosed. The multi-cavity vane is cast. The vane has a shroud, a platform, and a hollow airfoil extending between the shroud and platform. The airfoil also has a plurality of radial ribs which divide the airfoil into several cavities, wherein at least two ribs extend from the shroud through the airfoil and terminate prior to the platform. A metering plate mount is adjacent on of the at least two ribs and the platform. A desired cooling flow through the several cavities in the airfoil is determined, and a metering plate is fabricated. The metering plate is inserted into metering plate mount of the airfoil to achieve the desired cooling flow.

DETAILED DESCRIPTION

Figure 1:
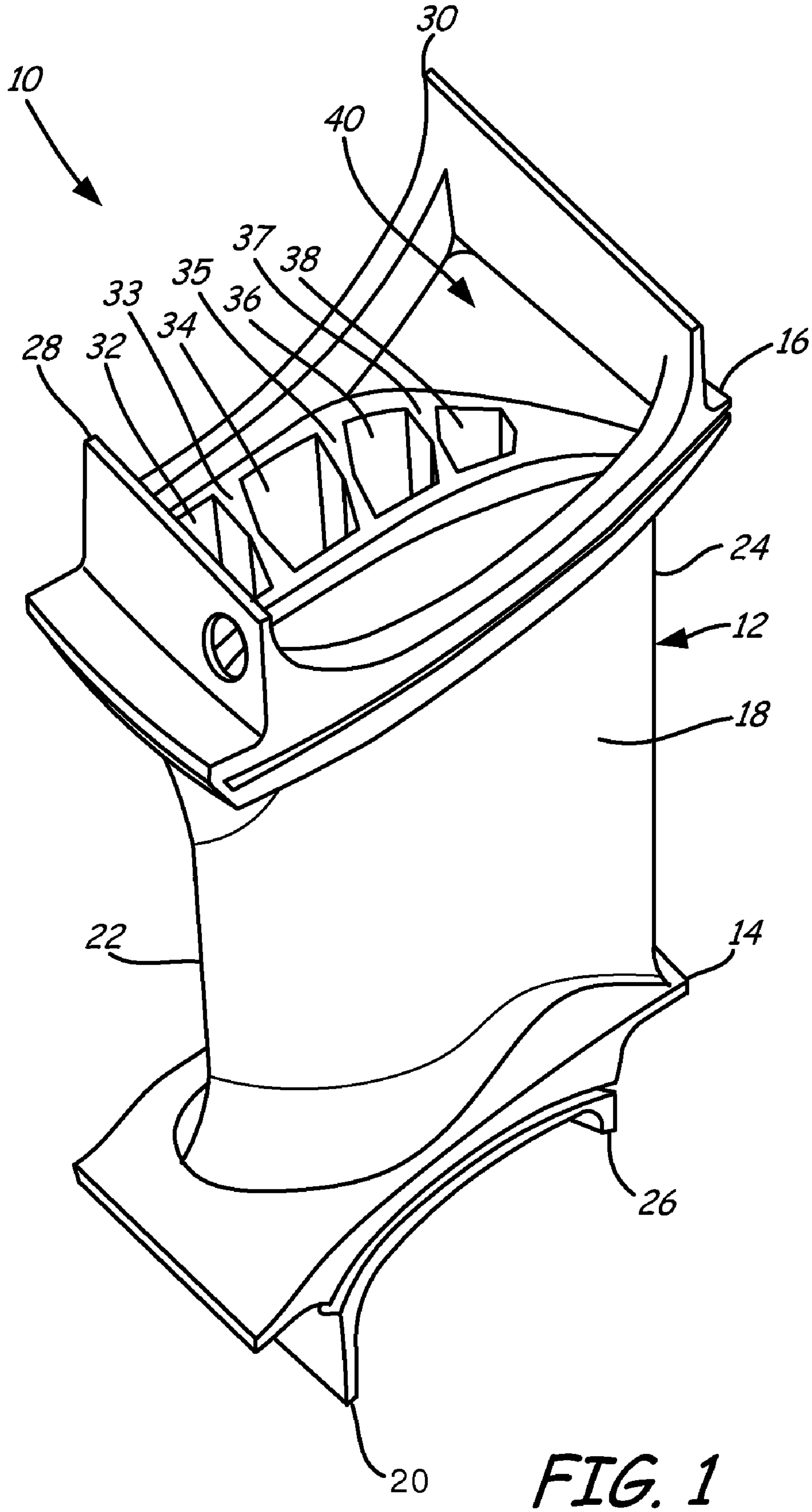
FIG. 1 is a top perspective view of a vane of a gas turbine engine.

FIG. 1 is a top perspective view of vane 10 of a gas turbine engine. Vane 10 is a circumferential segment of an engine nozzle and contains airfoil 12 extending between inner platform 14 and outer shroud 16. Airfoil 12 has a pressure surface 18 and a suction surface (not present in this view) that are between leading edge 22 and trailing edge 24. Platform 14 incorporates extensions 20, 26 which are utilized in mounting vane 10 within the gas turbine engine. Similarly, shroud 16 has extensions 28, 30 for securing to the outer portion of the engine.

Airfoil 12 is hollow, and contains cavities 32, 34, 36, and 38. Each cavity 32, 34, 36, and 38 is separated from the adjacent one by ribs 33, 35, and 37. Cavities 32, 34, 36, and 38 are chambers that are part of the cooling system of vane 10. Ribs 33, 35, and 37 are spaced in the interior of airfoil 12 to create pathways for fluids to travel and cool airfoil 12. Ribs 33, 35, and 37 extend radially through airfoil 12 and provide support for airfoil 12 to prevent deformation or damage from normal operation, which includes a working fluid exerting force on the pressure surface 18. Shroud 16 also has pocket 40, which receives air and directs the air into airfoil cavities 32, 34, 36, and 38 for cooling airfoil 12. Although four cavities and three ribs are illustrated, more or less may be used.

Figure 2:
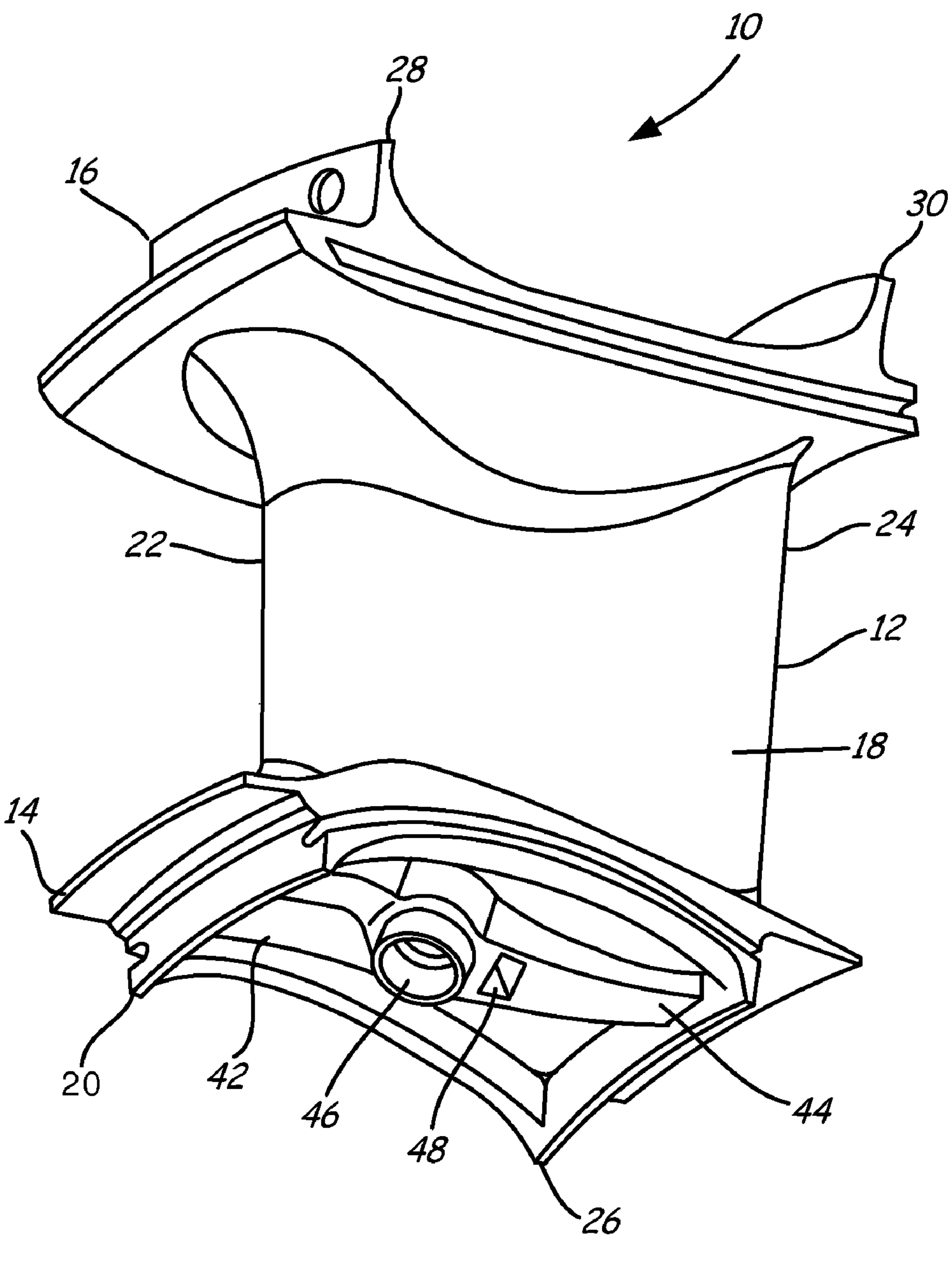
FIG. 2 is a bottom perspective view of the vane.

FIG. 2 is a bottom perspective view of vane 10 of a gas turbine engine. As similarly illustrated in FIG. 1, vane 10 contains airfoil 12 extending between platform 14 and shroud 16. Vane 10 also has pressure surface 18, a suction surface (not present in this view), leading edge 22, trailing edge 24, as well as extensions 20, 26, 28, and 30 as previously described.

The underside of platform 14 contains pocket 42 between extensions 20 and 26. Extending downward from pocket 42 is airfoil support 44, which contains fluid port 46 and metering plate access slot 48. Fluid port 46 allows for the exit of a fluid such as compressed air or steam introduced into the interior of airfoil 12 to provide cooling to the vane structure. Metering plate access slot 48 provides an insertion point into the interior of airfoil 12 for placement of metering plate 70 (See FIGS. 5, 6, and 8) to change the flow of the fluid within the interior of airfoil 12.

In one embodiment, vane 10 is made using a nickel or cobalt superalloy, or similar high temperature resistant material, and may contain ceramic or metallic coatings on a portion of the exterior and, or interior surfaces. Vane 10 may also be constructed from other alloys, metals, or ceramics, and may contain one or more coatings on the surfaces exposed to working fluids. Due to the complex structure of vane 10, including internal flowpaths for the cooling fluid, vane 10 is preferably made by investment casting, which is well known in the art.

Figure 3:
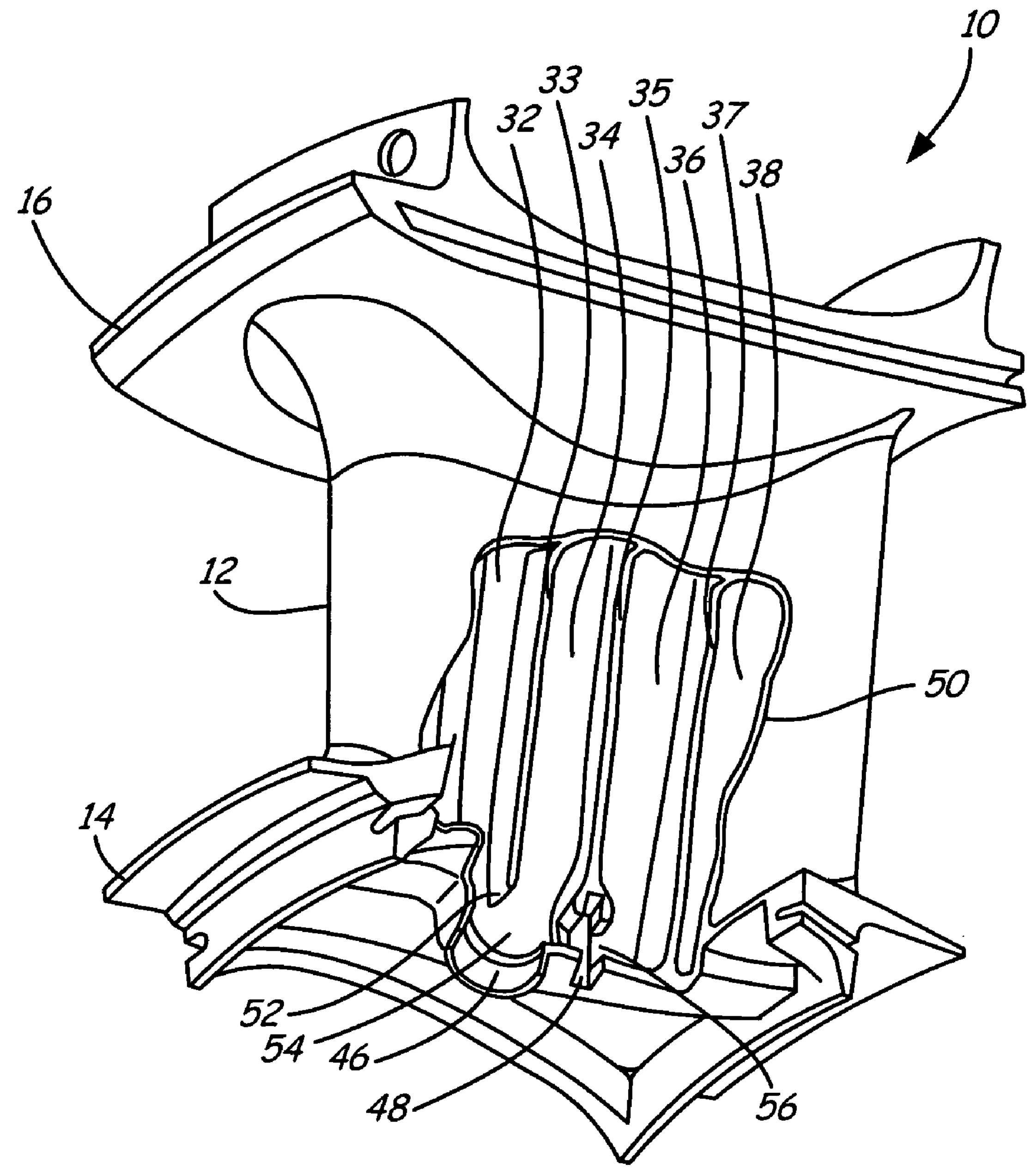
FIG. 3 is a perspective view of the vane with a portion of the airfoil and inner platform removed.

FIG. 3 is a perspective view from the bottom of vane 10 with a portion of airfoil 12 and platform 14 cut away to show the interior of vane 10. The portion removed is outlined by wall 50 of airfoil 12. This exposes inner cavities 32, 34, 36, and 38, as well as ribs 33, 35, and 37. A portion of each fluid port 46 and metering plate access slot 48 are visible as well. As illustrated, rib 33 terminates prior to joining platform 14, leaving rib end 52 in flow path 54 between adjacent inner cavities 32 and 34 in communication with fluid port 46. The end of rib 35 adjacent platform 14 contains metering plate mount 56. Metering plate mount 56 is cast as an original feature of vane 10. In an alternate embodiment, a mass of material adjacent the lower edge of rib 35 is integrally cast into the airfoil, and metering plate mount is formed by machining to remove material as illustrated. The machining method may also be used to retrofit an existing vane with a metering plate.

Cooling air traveling through inner cavities 32, 34, and 36 may exit from fluid port 46. Cooling air may also be traveling through internal cavity 38, but will exit trailing edge cooling holes (not illustrated). In an alternate embodiment, the lower end of rib 37 will terminate with an additional metering plate mount to allow installation of a second metering plate. Ribs 33, 35, and 37 are illustrated as being vertical and perpendicular with respect to platform 14 and shroud 16. In alternate embodiments, the radial ribs are angled with respect to platform 14. Of course, more or less inner cavities and ribs may exist.

Figure 4:
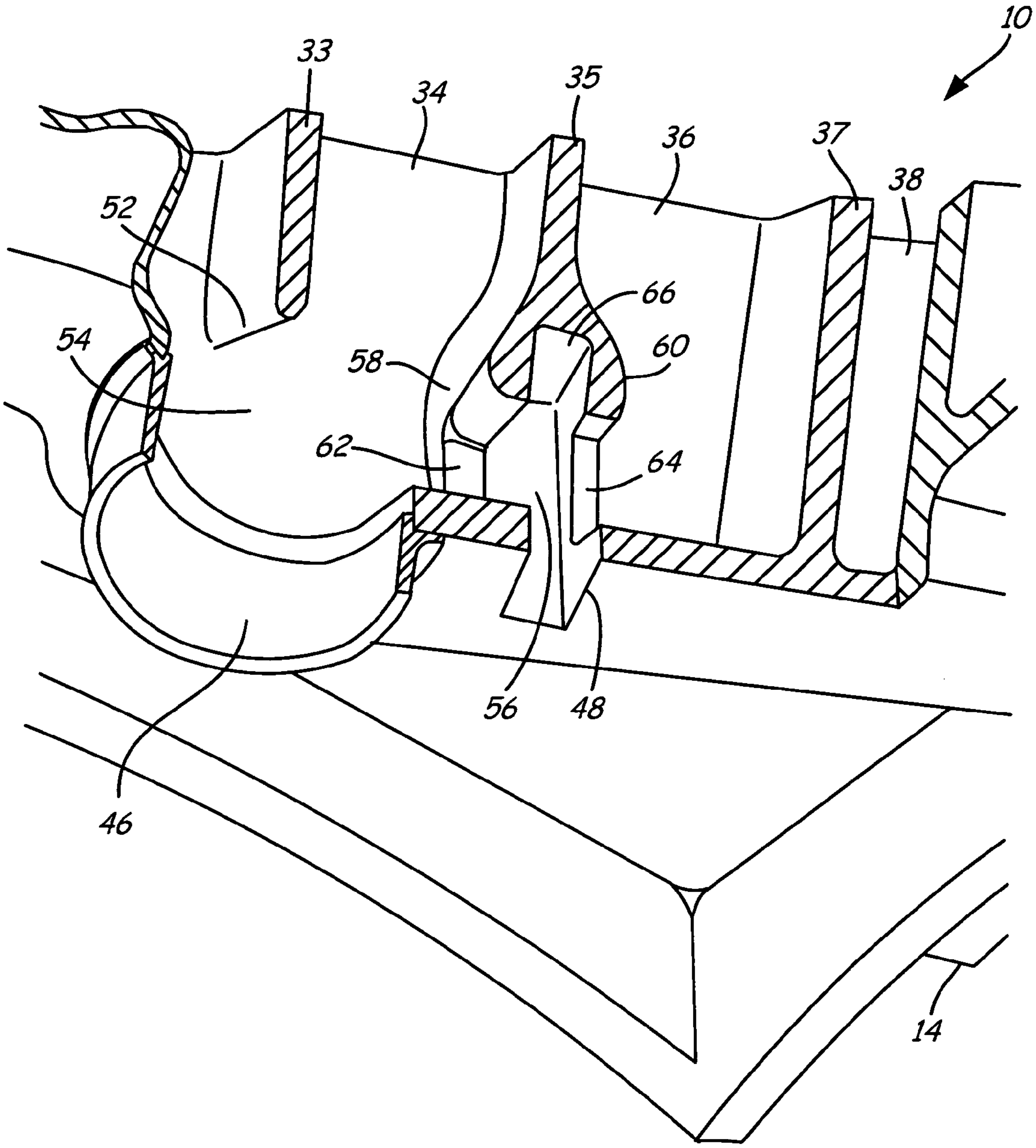
FIG. 4 is a perspective view of the vane with a metering plate slot.

FIG. 4 is a detailed perspective view from the bottom of a portion of vane 10 with a portion of airfoil 12 and platform 14 removed for clarity. Visible in this view are ribs 33, 35, and 37, inner cavities 32, 34, 36, and 38, fluid port 46, and metering plate access slot 48. Metering plate access slot 48 extends through platform 14 to metering plate mount 56, which is comprised of leading edge guide 58 containing aperture 62 and trailing edge guide 60 containing aperture 64. Leading edge guide 58 and trailing edge guide 60 are preferably, integrally cast during the formation of vane 10, and merge above unshaped metering plate stop 66 to join near the bottom of rib 35. As discussed earlier, the metering plate access slot 48 and associated features may also be machined into an existing vane. Leading edge guide 58 and trailing edge guide 60 act much like brackets and create a holder for metering plate 70 (See FIG. 5), while still leaving a flowpath for the cooling fluid to pass through from internal cavity 36 to exit fluid port 46. Leading edge guide 58 and trailing edge guide 60 are constructed to allow sealing with metering plate 70 to prevent leakage of fluids past the edges of metering plate 70, which can affect cooling of the airfoil.

Figure 5:
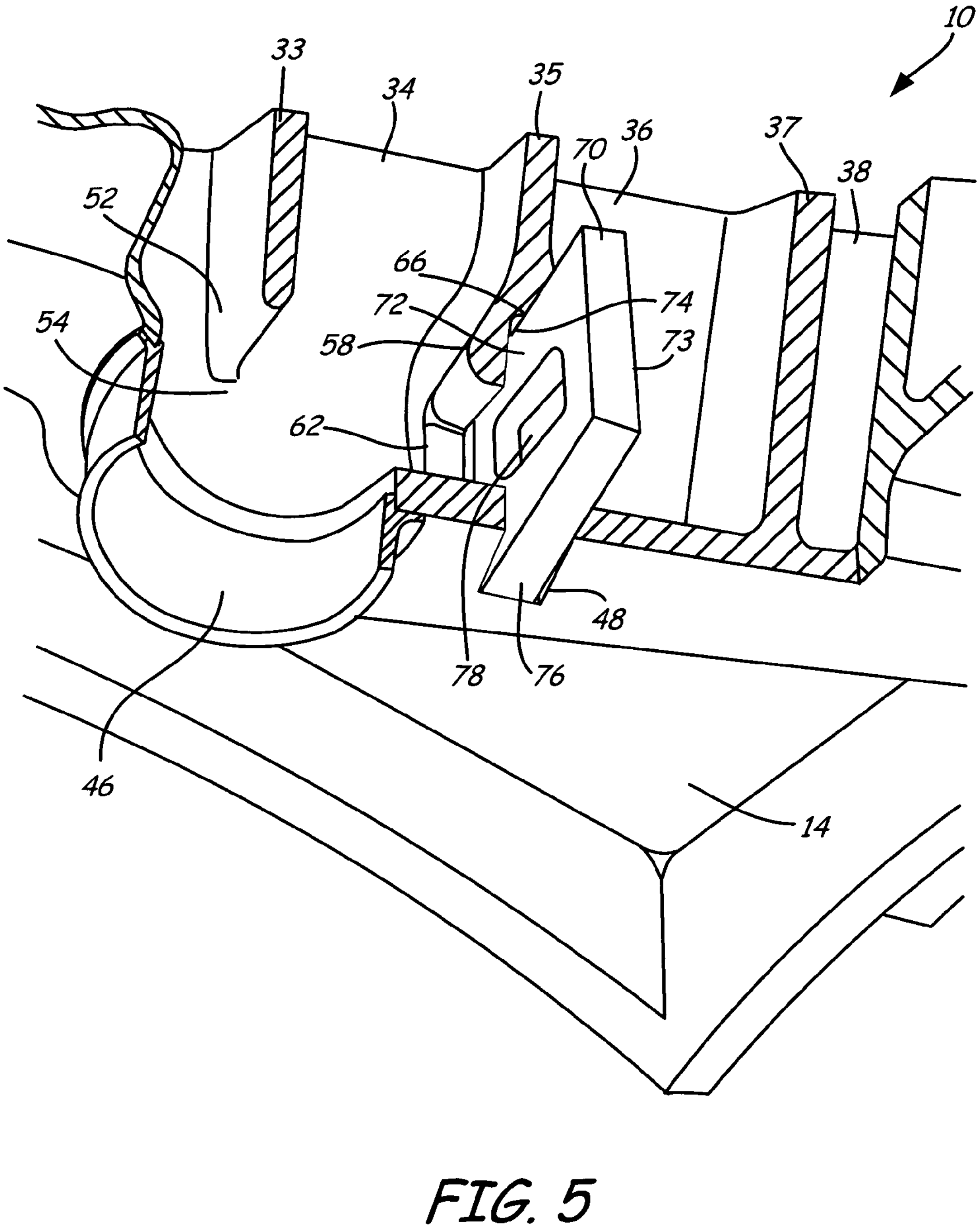
FIG. 5 is a perspective view of the vane of FIG. 4 with a metering plate inserted into the slot.

FIG. 5 is another perspective view of vane 10 with a metering plate 70 inserted into metering plate access slot 48. Metering plate 70 is formed separately from vane 10. Metering plate 70 is constructed from any suitable material including an alloy or metal, preferably with similar properties to that from which the vane is constructed, and thus can withstand the environment in which metering plate 70 is placed. Metering plate may be fabricated from an existing piece of material, or may be cast to required design specifications.

Leading edge side 72 of metering plate 70 is adjacent leading edge guide 58. Similarly, trailing edge side 73 is adjacent the trailing edge guide 60 (as visible in FIG. 4). Top edge 74 of metering plate 70 mates with plate stop 66. The aforementioned arrangement facilitates for radial placement of metering plate 70 generally parallel and in-line with rib 35. After installation, bottom edge 76 of metering plate 70 is secured to platform 14 by methods known in the art such as welding, brazing, application of adhesives, or installing additional mechanical fasteners such as a cover plate. In alternate embodiments, metering plate 70 is held in place by the pressure, or is held in place due to thermal expansion, commonly referred to as a shrink fit or interference fit.

Metering plate 70 contains an aperture 78. In the embodiment illustrated, the metering plate 70 is generally rectangular in shape, and aperture 78 is a centrally located rectangular cut out; however, other shapes such as circular are contemplated. Once installed, metering plate 70 is secured between leading edge guide 58 and trailing edge guide 60 (see FIG. 4), which surround metering plate 70 and prevents fluid flow around the plate 70 so fluid flow is only through aperture 78. This assures that the fluid flow is maintained as designed through aperture 78 without any leakage to create unwanted pressure drop within inner cavity 36. Aperture 78 is sized to create a desired fluid flow through inner cavity 36, and is fabricated as a part of the manufacturing process which creates metering plate 70.

Figure 6:
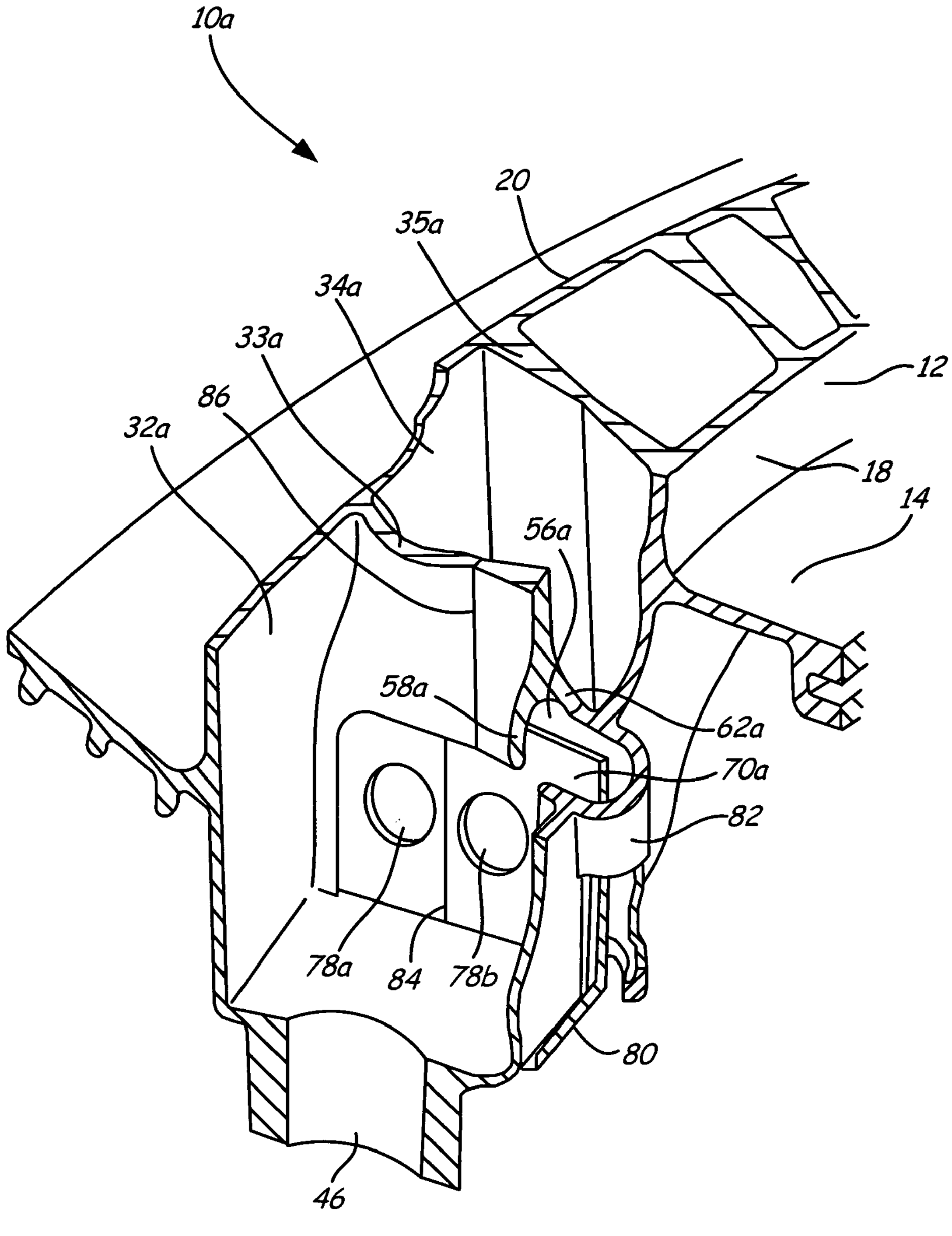
FIG. 6 is a perspective view of a different embodiment of a vane with a metering plate.

FIG. 6 is a perspective view of an alternate embodiment of the current invention. In this embodiment, vane 10*a* has airfoil 12 including ribs 33*a* and 35*a*, and inner cavities 32*a* and 34*a*, platform 14, and fluid port 46. Also shown is metering plate 70*a*. In this embodiment, metering plate 70*a* contains apertures 78*a* and 78*b*, which are generally circular in shape. Metering plate 70*a* is L-shaped, containing a horizontal portion or leg 80 that extends axially towards the leading edge. Leg 80 facilitates attachment of metering plate to the bottom of platform 14 adjacent fluid port 46. In an alternate embodiment, metering plate 70*a* may be t-shaped, having two legs, one of each extending towards the leading edge and trailing edge. Metering plate 70*a* is located within airfoil 12 by leading edge guide 58*a* and trailing edge guide 62*a*, which merge into the bottom side of rib 33*a*. In this embodiment, leading edge guide 58*a* and trailing edge guide 62*a* extend past pressure surface 18 and the suction surface, respectively, and join to form pressure side slot extension 82.

Rib 33*a* contains bend 86 between the pressure surface 18 and the suction surface of airfoil 12. Bend 86 results in rib 33*a* containing an angled wall, which is illustrated as being angled a couple of degrees with the apex of the angle centrally located on the rib. In alternate embodiments, the angle may be up to ninety degrees, and the apex may be closer to either the pressure surface 18 or the suction surface provided that the rib still is in contact with both surfaces 18 and 20. Metering plate 78*a* contains a corresponding bend 84, which allows metering plate 78*a* to form a seal within metering plate mount 56*a*. Apertures 78*a* and 78*b* are each on a different side of bend line 86, which facilitates better control of fluid flow through inner cavity 35*a*.

Figure 7:
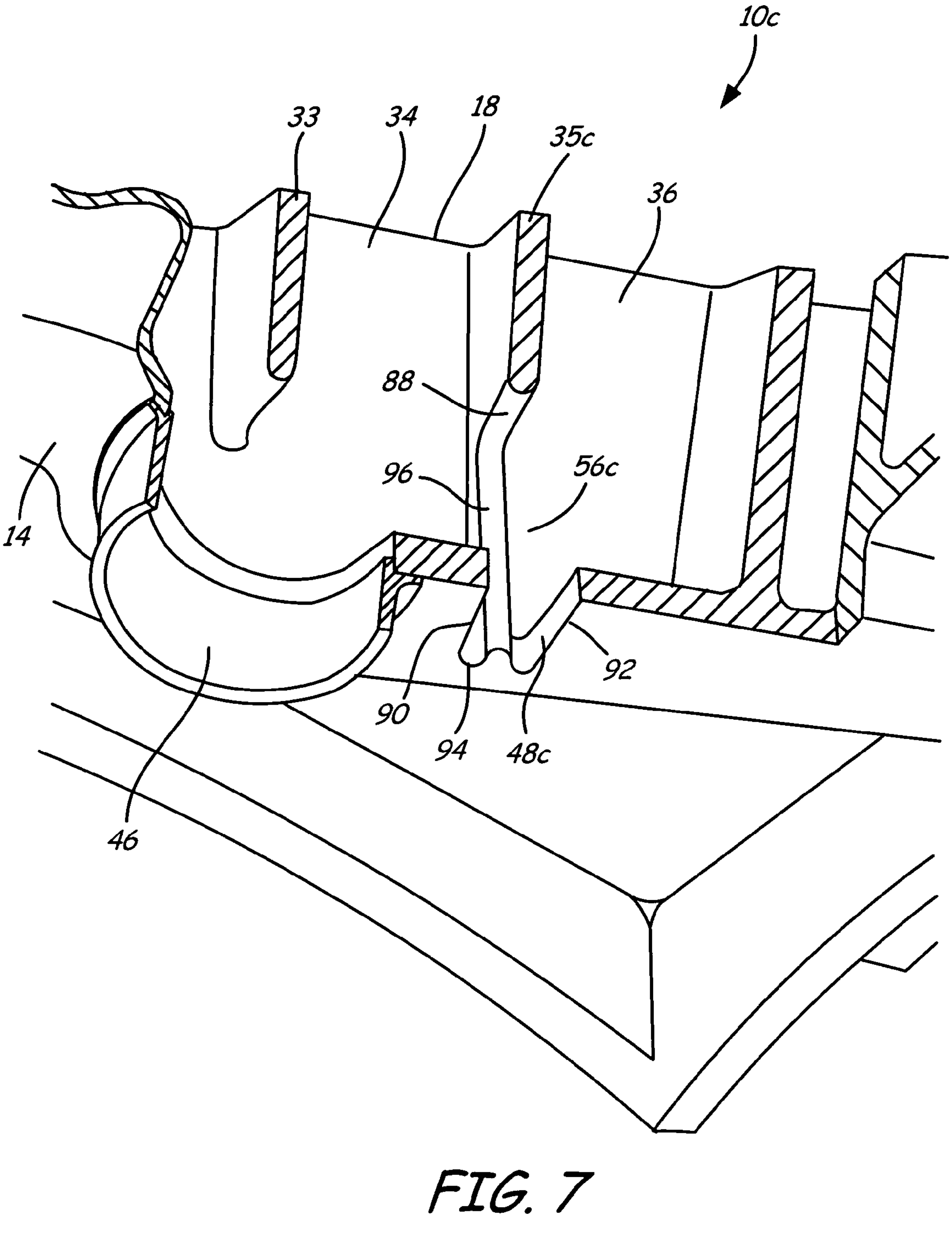
FIG. 7 is a perspective view of a yet another embodiment of a vane with a metering plate slot.

FIG. 7 is a perspective view of a portion of vane 10*c* illustrating an alternate embodiment of metering plate mount 56*c*. In this embodiment, the perimeter of slot 48*c* is not rectangularly shaped, but rather has two longitudinal sides 90 and 92 that are connected by a w-shaped end 94 adjacent the pressure side of airfoil 12. A similar end (not illustrated) is adjacent suction side of airfoil 12.

Rib 35*c* terminates approximately at the same depth in the airfoil as rib 33 at lower edge 88. Attached to lower edge 88 of rib 35*c* adjacent pressure surface 18 is extension 96. Extension 96 is a rail structure that extends down and terminates in metering plate slot 48*c*, thus forming w-shaped end 94. Lower edge 88 of rib 35*c* and the edge of extension 96 generally form a ninety degree angle with respect to one another. Lower edge 88 of rib 35*c* and edge of extension 96 are illustrated as containing rounded fillets, although in other embodiments the edges may be chamfered or flat.

Figure 8:
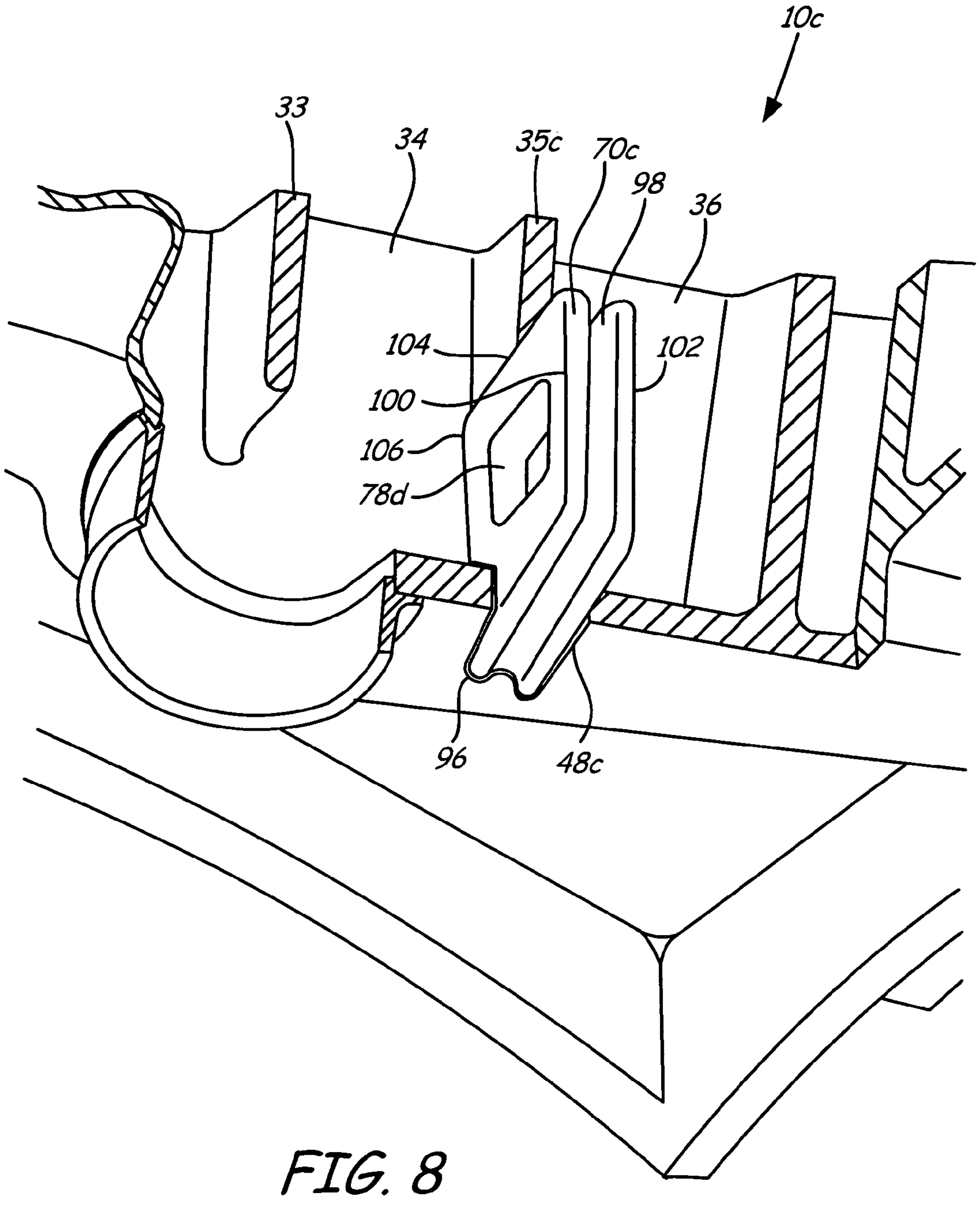
FIG. 8 is a perspective view of the vane in FIG. 7 with a metering plate inserted into the metering plate slot.

FIG. 8 is another perspective view of vane 10*c* with metering plate 70*c* inserted into metering plate access slot 48*c*. Metering plate 70*c* contains a centrally located and generally rectangular aperture 78*d*. The perimeter of metering plate 70*c* contains a u-shaped channel 98 between leading edge side 100 and trailing edge side 102. Top surface 104 of metering plate 70*c* mates with lower edge 88 (see FIG. 7) of rib 35*c* via the unshaped channel, and pressure edge 106 of metering plate 70*c* mates with extension 96 (See FIG. 4). Similarly, the suction edge of metering plate 70*c* will mate with an extension adjacent the suction surface. With unshaped channel 98 mating with corresponding structures in the airfoil, metering plate 70*c* creates a seal that inhibits airflow except for airflow that travels through aperture 78*d*.

All of the embodiments mentioned above may preferably be cast into any airfoil of a gas turbine that contains cooling channels with ribs adjacent the platform. The airfoil is designed to contain a metering plate mount adjacent one of the internal ribs of the airfoil. The platform below the airfoil will be designed with a corresponding metering plate slot that allows for the insertion of the metering plate into the metering plate mount. After the design is complete, the airfoil is cast to include the metering plate mount structure and metering plate slot.

Next, the airfoil is studied to determine a desired flow of cooling fluid through the cooling channels. This may be done through modeling of flow, or by taking actual measurements of parameters (including temperature, fluid velocity and pressure) during engine operation. From this, a design of the metering plate is obtained, including the size and placement any required apertures to achieve the desired flow pattern through the airfoil. The design also includes the perimeter design to assure sealing between the metering plate and metering plate mount. The metering plate is then fabricated.

After fabrication, the metering plate is inserted into the airfoil through metering plate slot. The plate may be sealed within the airfoil to the metering plate mount by the use of adhesives, braze alloys, or similar sealing elements. In an alternate embodiment, the plate is super-cooled to reduce its size, inserted into the metering plate slot, and then allowed to expand to form a seal with the metering plate mount.

After insertion, the metering plate is then secured. The sealing process may provide the necessary attachment to the vane. In an alternate embodiment, the bottom of the plate is brazed or welded to the platform of the vane. In another alternate embodiment, a removable cover plate is placed over the metering plate slot to hold the metering plate within the metering plate mount.

A vane with the generally radial metering plate near the fluid flow exit contains several advantages. First, the cooling cavities do not experience the pressure drop associated with the horizontal or axial metering plates adjacent the outer band and pocket 40 (FIG. 1). The pressure loss will be at the end of the cavity, thus giving the full length of the cavity the benefits of higher pressure without the need to increase fluid flow as required by the axial metering plate systems. Cooling fluid inlet pressure losses are minimized. Second, the metering plate can be made to be a replaceable part. This is advantageous to repair any worn or damaged parts, or to adjust and tune the fluid flow of the vane as may be desired after extended use of the engine; Third, the metering plate can be tuned to adjust the cooling of different airfoils in a multi-airfoil vane nozzle segment to account for circumferential temperature variations exiting the combustor. Similarly, more than one metering plate may be placed in a single airfoil adjacent multiple ribs, thus tuning each cavity adjacent the metering plate. The plate can be designed for each engine that uses the metering plates, with variations in aperture size and location within each plate. Existing vane segments may be retrofitted with a metering plate to incorporate the benefits described.

Although the present invention has been described with reference to preferred embodiments, workers skilled in the art will recognize that changes may be made in form and detail without departing from the spirit and scope of the invention.

The invention claimed is:

1. A turbine vane segment comprising:
a platform and a shroud spaced from one another;
an airfoil extending between the shroud and platform and having a leading edge and a trailing edge and a pressure wall and a suction wall, the airfoil including a plurality of generally radial ribs extending between the pressure wall and suction wall and defining a plurality of discrete cavities between the leading edge and trailing edge that extend lengthwise of the airfoil;
wherein the shroud contains at least one opening to allow a cooling fluid into the cavities, and the platform contains at least one exhaust port to allow the cooling fluid to exit the cavities;
wherein at least one of the ribs has a metering plate mount adjacent a bottom side of the rib; and
a metering plate inserted within the airfoil into the metering plate mount.

2. The vane segment of claim 1 wherein the metering plate contains a single aperture to allow the flow of a cooling fluid to pass through the metering plate.

3. The vane segment of claim 1 wherein the metering plate contains a plurality of apertures to allow the flow of a cooling fluid to pass through the metering plate.

4. The vane segment of claim 2 wherein the metering plate is secured to the platform.

5. The vane segment of claim 1 wherein the metering plate is secured to the metering plate mount.

6. The vane segment of claim 5 wherein the metering plate is secured using a braze alloy.

7. The vane segment of claim 1 wherein the metering plate is inserted to be generally in line with the generally radial rib.

8. The vane segment of claim 1 wherein the metering plate is L-shaped, with a generally radial portion extending into the airfoil, and a generally axial portion for securing the metering plate to the platform.

9. A nozzle assembly for directing cooling fluid in a vane, the assembly comprising:

a hollow airfoil having at least two cooling chambers, the chambers separated by a generally radial rib;

a metering plate mount attached to the rib;

a metering plate, having at least one aperture for tuning the cooling fluid flow within the airfoil, adjacent the metering plate mount.

10. The nozzle assembly of claim 9 wherein the metering plate is secured to the metering plate mount to create a seal between the metering plate and metering plate mount.

11. The nozzle assembly of claim 9 wherein the metering plate has more than one aperture.

12. The nozzle assembly of claim 9 wherein the metering plate mount is a rail structure and the metering plate contains a channel for securing the metering plate to the rail.

13. The nozzle assembly of claim 12 wherein the metering plate is secured by welding, brazing, or adhesives.

14. The nozzle assembly of claim 9 wherein the metering plate mount is cast into the vane during original manufacture of the vane.

15. The nozzle assembly of claim 9 wherein the metering plate mount is machined into the vane.

16. A method of cooling a multicavity vane for a gas turbine engine, the method comprising:

fabricating the multi-cavity vane, wherein the vane comprises:

a shroud and a platform;

a hollow airfoil extending between the shroud and platform, the airfoil having a plurality of radial ribs which divide the airfoil into several cavities; wherein at least two ribs extend from the shroud through the airfoil and terminate prior to the platform; and a metering plate mount positioned within the airfoil adjacent to one of the at least two ribs and the platform;

determining a desired cooling flow through the several cavities in the airfoil;

fabricating a metering plate;

inserting the metering plate into metering plate mount of the airfoil to achieve the desired cooling flow.

17. The method of claim 16 wherein the multi-cavity vane further comprises:

at least one opening in the shroud for introduction of a cooling fluid; and a metering plate access slot and at least one opening for the exhaustion of the cooling fluid in the platform.

18. The method of claim 17 inserting the metering plate comprises:

introducing the metering plate through the metering plate access slot so that the metering plate is generally parallel and in line with one of the plurality of ribs.

19. The method of claim 16 further comprising:

securing the metering plate within the airfoil.

20. The method of claim 16 further comprising:

sealing the metering plate with respect to the metering plate mount.

* * * * *

UNITED STATES PATENT AND TRADEMARK OFFICE

CERTIFICATE OF CORRECTION

PATENT NO. : 8,016,547 B2
APPLICATION NO. : 12/009716
DATED : September 13, 2011
INVENTOR(S) : Tracy A. Propheter-Hinckley It is certified that error appears in the above-identified patent and that said Letters Patent is hereby corrected as shown below:

Col. 3, Line 67
Delete "unshaped"
Insert --u-shaped--

Col. 5, Line 36
Delete "unshaped"
Insert --u-shaped--

Col. 5, Line 39
Delete "unshaped"
Insert --u-shaped--

Signed and Sealed this
Eighth Day of November, 2011

David J. Kappos

David J. Kappos
*Director of the United States Patent and Trademark Office*